June 12, 1934.    F. ADAMS    1,962,229
COUPLING
Filed July 30, 1932
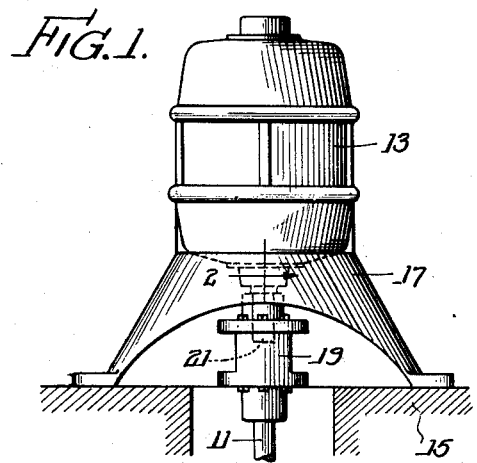
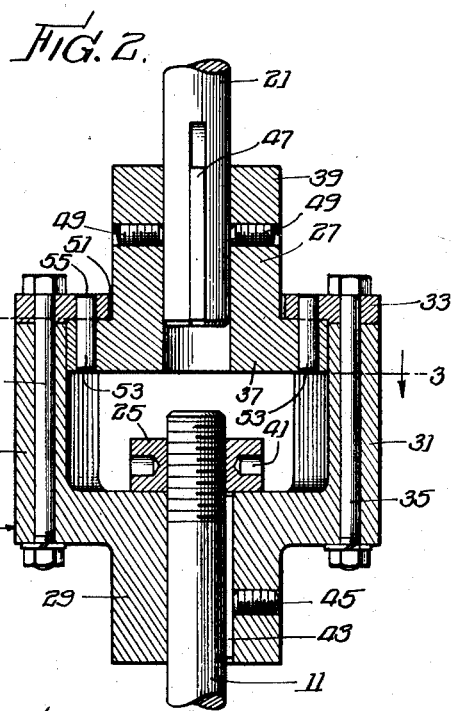
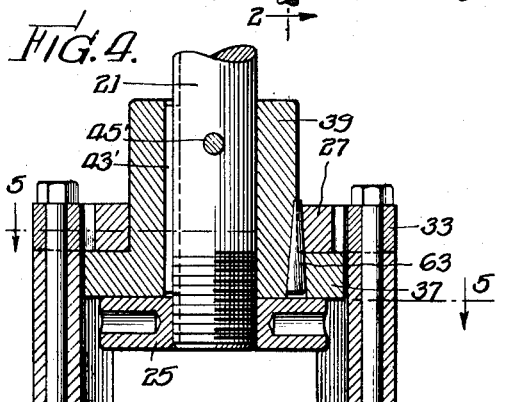
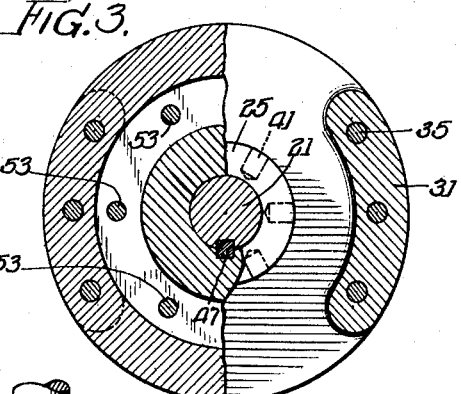
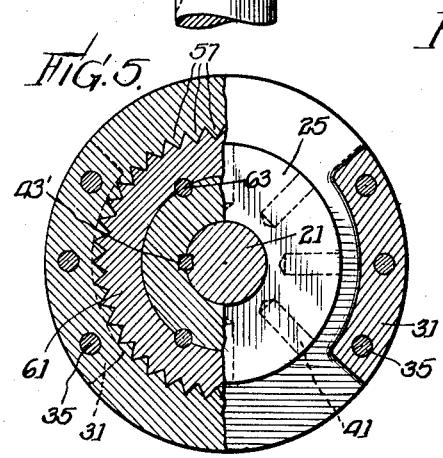
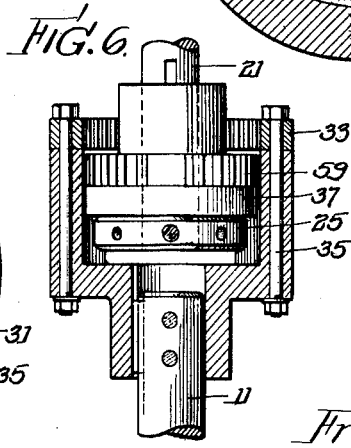
Inventor:
Frank Adams
Cox & Moore
attys.

Patented June 12, 1934

1,962,229

UNITED STATES PATENT OFFICE 1,962,229

COUPLING

Frank Adams, Mansfield, Ohio, assignor to Ideal Electric & Manufacturing Co., Mansfield, Ohio, a corporation of Ohio Application July 30, 1932, Serial No. 626,996

1 Claim. (Cl. 64—89)

My present invention relates in general to a coupling and has more particular reference to a novel and improved coupling for a rotating shaft, more especially a coupling for shafts utilized in driving deep well pumps.

A deep well pump usually consists of a turbine impeller located in the lower well casing and driven by means of a shaft extending upwardly through a casing to suitable driving means located at the upper end of the well.

In such instances, considerable difficulty has been encountered in taking care of so-called "back spin" of the driving motor, which is the effect created whenever the speed of the driving motor falls below the driven speed of the turbine as when, in the case of an electrically driven motor, the motor is, for any reason, disconnected from its source of power, or breakage of the belt, or other transmission element in the case of mechanical power connection for the motor shaft. "Back spin" also may be caused by starting the motor in the wrong direction so that power is applied to the pump shaft to drive it in reverse direction. Such a condition presses considerably upon the driving shaft especially in the case of a deep well, and the shaft, the sections of which are usually connected together by means of threaded couplings, will have a tendency to become uncoupled, especially if the condition lasts for an appreciable period.

One of the important objects of my present invention is to provide a self-releasing clutch mechanism in a coupling of the class described, whereby the shaft will automatically disconnect itself from the driving motor after back-spin conditions have continued for a predetermined interval considerably less than that required for the shaft sections to become uncoupled, said coupling being arranged to automatically re-couple the turbine shaft to the motor as soon as backspin conditions are removed.

Another important object is to provide a coupling of the class described having means for adjusting the shaft, with which the coupling is associated, axially whereby the elevation of the turbine impeller within its casing may be adjusted from the top of the well after the driving shaft has been assembled and connected to the driving motor; it being obvious that the turbine pump, when in place in the bottom of a well casing is inaccessible for accomplishing adjustments in the alignment of the turbine impeller in its casing.

Another important object of my present invention is to provide a self-releasing adjustable clutch coupling for deep well turbine pumps, wherein the coupling is designed to transmit the thrust on the pump shaft to the driving motor wherein the thrust is or may be absorbed in a suitable bearing at the top of the well shaft and thus eliminate the necessity of providing special bearings within the well casing and at various intervals therein, it being one of the purposes of my invention to simplify, as much as possible, the apparatus which necessarily has to be housed in accessible position within the well.

Numerous other objects and advantages will be fully understood from the following description, which, taken in connection with the accompanying drawing, discloses a preferred embodiment of my invention.

Referring to the drawing:

Fig. 1 is a perspective view, partially in section, showing a coupling embodying my present invention as mounted at the upper end of a well shaft between the pump shaft and the driving motor;

Fig. 2 is a vertical section taken substantially along the line 2—2 in Fig. 1;

Fig. 3 is a horizontal section taken substantially along the line 3—3 in Fig. 2;

Fig. 4 is a vertical section similar to Fig. 2, illustrating a modified coupling construction embodying my present invention;

Fig. 5 is a horizontal section taken substantially along the line 5—5 in Fig. 4; and Fig. 6 is a sectional view in the apparatus as shown in Fig. 4, showing the parts in shifted or uncoupled position.

To illustrate my invention, I have shown on the drawing, the upper end of a turbine pump drive shaft 11, an electric drive motor 13 supported on a suitable base 15 above the upper end of the shaft 11, the motor being carried on a pedestal 17 sufficiently above the end of the shaft 11 to permit an adjustable, self-releasing clutch coupling 19 to be assembled between the lower end of the motor shaft 21 and the upper end of the pump shaft 11, the pedestal preferably comprising a plurality of spaced legs permitting access to the coupling therebetween. The coupling 19 comprises a frame 23 having means therein to receive and connect with the adjacent ends of the pump shaft 11 and motor shaft 21. One of these shafts is preferably firmly fixed against axial movement with respect to the coupling while the other is provided with means 25 for adjusting the coupling axially thereon.

In the embodiment illustrated in Fig. 2 of the drawing, the pump shaft 11 is thus adjustably secured with respect to the coupling, while in the construction illustrated in Fig. 4, the motor shaft 21 is provided with means for adjusting the coupling with respect to the shaft.

One of the shafts also is, or may be, provided with releasable means 27 for non-rotatably clutching the shaft to the coupling, the other shaft being non-rotatably splined to the frame 23. In both of the illustrated embodiments, the upper or motor shaft 21 is provided with the clutch construction although it will be obvious as the description proceeds, that the self-releasing clutch mechanism may be formed on the lower or pump shaft 11.

In both of the embodiments illustrated, the clutch comprises a frame 23, the lower portions of which are formed to provide a bushing 29 adapted to receive one of the shafts (the pump shaft is shown assembled in the bushing 29, although obviously the coupling could be inverted and the motor shaft assembled in the bushing 29 if desired). The frame 23 also has one or more wall portions 31 extending upwardly thereof and a cover 33 extending across and connected to the upper edges of the wall portions 31 by means of bolts 35. The spacing between the walls 31 is occupied by an annular coupling member 37 having a central portion extending upwardly through the cover 33, said central portion forming a bushing 39 adapted to receive the end of the other shaft which is not assembled in the bushing 29 in the lower portion of the frame 23. As illustrated, the motor shaft 21 is received within the bushing 39. To this extent, both of the illustrated embodiments are similar in construction.

Referring now more particularly to the embodiment illustrated in Fig. 2, of the drawing, the shaft 11, which is assembled in the lower bushing 29, is threaded at its upper end to receive the threaded portion 25, which, in the illustrated embodiment, comprises a nut adapted to engage the upper end of the pump shaft 11. This nut is provided with circumferential openings 41 adapted to receive the end of a spike so that the same may be rotated on the shaft to adjust the shaft axially with respect to the bushing 29. The shaft 11 is also keyed as at 43 to the bushing 29 to prevent relative rotation therebetween and a set screw 45 is provided to lock the shaft against axial movement in the bushing after the same has been adjusted therein by the operation of the adjusting means 25 as aforesaid. The shaft 21 is also keyed as at 47 in the bushing 39 and the parts are locked against axial movement by means of set screws 49 or other suitable locking means. The base of the coupling 37 also extends outwardly of the bushing and engages beneath the cover plate 33, the central portions are provided with an opening 51 to permit the bushing 39 to extend therethrough. The portions of the member 37 which underlie the cover plate 33 are provided with a plurality of spaced pins 53 which, as indicated in Fig. 3 of the drawing, extend around the circumference of the member. The cover plate 33 also is provided with a circular series of spaced perforations 55 arranged in position to receive the upwardly projecting ends of the pins 53 so that when the pins and perforations are in alignment, the pins may enter the perforations and form a dog-clutch with the pins 53.

It will be obvious that a clutch of the type described may be assembled between the driving shaft of a motor and the pump shaft of a deep-well turbine and, under ordinary conditions, the pump impeller, which is suspended at the lower end of the shaft 11, may be adjusted within its casing from the upper end of the well by properly adjusting the nut 25 after which the set screw 45 will secure the parts in adjusted position. Under ordinary conditions also, the several sections of the shaft 11 being screwed up tight, the shaft will be of minimum length and the casing 23 will hang on the coupling member 37 with the pins 53 engaging in the perforations 55. If, however, the back-spin conditions arise, the various sections of the shaft 11 will become partially unscrewed with the result that the effective length of the shaft will be increased. This will raise the casing 23 sufficiently to disengage the pins 53 from the sockets 55 so that the driving connection between the motor 13 and the shaft 11 will be destroyed and the former will back spin freely without driving the shaft in the wrong direction.

In the embodiment illustrated in Fig. 4 of the drawing, the pump shaft 11 is firmly fastened in the bushing 29, is splined against rotation therein as at 47' and is locked against axial movement by means of set screws 49' in a manner similar to the motor shaft 21 in the bushing 39 in the embodiment shown in Fig. 2. In the embodiment illustrated in Fig. 4, however, the motor shaft 21 is connected for axial adjustment in the bushing 39, in substantially the same manner as the pump shaft 11 is connected in the lower bushing 29 in the embodiment shown in Fig. 2. In Fig. 4, also the central perforation of the cover plate 33 is provided with a series of internal gear teeth 57, which are adapted to mesh with the external gear teeth 59 of a pinion 61, which encircles the bushing 39 and is secured to the coupling member 37 at the lower end of the bushing in any suitable manner as by the dowel pins 63.

It will be understood that this construction also provides for a self-releasing clutch connection between the shaft 21 and the frame 23. When the motor 13 rotates in the proper pump drive direction, the connections between the several sections of the shaft 11 will be tightened and the shaft 11 will have a minimum effective length. As soon as the back spinning occurs in the motor, the shaft 11 will tend to increase in length with the result that the motor shaft 21 is raised by the shaft 11 until the teeth of the gear 61 release the teeth 57 of the internal gear formed in the plate 33. When this happens, the motor will be disconnected from the shaft and further rotation of the motor in the wrong direction will not be transmitted to the shaft. It will also be noted that when the coupling is in proper driving position, the axial position of the pump shaft 11 may be changed by adjusting the nut 25, which, in the embodiment under discussion, threadingly connects the lower end of the motor shaft 21, which is splined to the bushing 39 as at 43' and is held in adjusted position by means of the set screws 45'.

It will be noted that in the forms of the coupling which I have disclosed, there is a substantially peripheral bearing surface on the motor shaft 21 which cooperates with a similar bearing surface of substantial size on the impeller shaft whereby the end thrust is taken care of with a minimum tendency of shearing on the supporting members which carry the bearing surfaces. With this construction, the bearing surfaces can be increased to any desired extent for carrying any desired load. There are also a multiplicity of driving connections spaced peripherally about the axis of each of the shafts to distribute over a great number of surfaces the driving force between the shafts.

It is thought that the invention and numerous of its attendant advantages will be understood from the foregoing description and it is obvious that numerous changes may be made in the form, construction, and arrangement of the several parts without departing from the spirit or scope of my invention or sacrificing any of its attendant advantages.

Having thus fully described my invention, what I claim as new and desire to obtain by Letters Patent is:

In a device of the class described, the combination of a motor shaft, an impeller shaft in alignment with said motor shaft and below the same, and a separable coupling for connecting said shafts in operative driving relation with each other, comprising a member on said motor shaft having an upwardly facing bearing surface thereon extending in a horizontal plane, a second member surrounding said motor shaft and secured to said impeller shaft, said second member having laterally spaced vertical walls enclosing a central space within which is located the first member and said second member having a horizontal portion with a downwardly facing bearing surface co-mating with said first mentioned bearing surface on said first member when said members are in operative position with respect to each other, a disconnectible driving connection between said members when said members are in engagement with each other for driving said members in unison with each other when said motor is actuated but disconnectible automatically upon longitudinal movement of the shafts relatively to each other in a direction to move said co-mating surfaces of said members away from each other, and an adjusting nut threaded to the end of one of said shafts and located in the space enclosed by the walls of said first member and bearing upon the member with which it is associated, said nut being accessible between said vertical walls of the first member and adapted to adjust the connection between the shaft and the coupling member to which it is connected.

FRANK ADAMS.